Patented June 5, 1934

1,961,931

UNITED STATES PATENT OFFICE 1,961,931

COATING COMPOSITION

Irvin W. Humphrey, Wharton, N. J., assignor to Hercules Powder Company, a corporation of Delaware No Drawing. Application January 2, 1929, Serial No. 329,955

11 Claims. (Cl. 134—79)

My invention relates to an improvement in coating compositions and more particularly to compositions of a character such that ester gums formed from resin acids may be more desirably included as an ingredient, as for example, in varnishes, lacquers, and the like, than has hitherto been the case.

Heretofore in coating compositions, as for example, varnishes, lacquers, and the like, it has been known to utilize ester gum as an ingredient, the ester gum being formed, for example, from abietic acid, pimaric acid and the like, to displace fossil resins in whole or in part. Ester gums as heretofore known and as included in coating compositions have, however, not proved entirely satisfactory for certain conditions of use in the coating composition, chiefly because of the fact that they tend to absorb oxygen gradually, and lose flexibility on exposure.

The inclusion of an ester gum which will become less flexible on exposure is deleterious to coating compositions and where such is included the film resulting from the composition will possess lack of flexibility and hence relatively low durability.

Now, in accordance with my invention, I have discovered that if a hydrogenated ester gum be included in coating compositions of the character indicated and the use of ordinary ester gum is avoided, a film having desirable flexibility and consequent durability will be produced.

In accordance with my invention a hydrogenated ester gum may be included in coating compositions of the character of varnish, and also in coating compositions of the character of lacquer containing, for example, nitrated carbohydrates, as nitrocellulose, nitrostarch, and the like. Where the hydrogenated ester gum is included in a composition of the character of a varnish, the composition may include as ingredients a hydrogenated ester gum, as hydrogenated ethyl abietate, hydrogenated glyceryl abietate, etc., and such other ingredients as may be desirable, such, for example, as linseed oil, a drier, as lead linoleate, china wood oil, turpentine, mineral spirits, etc.

In coating compositions of the character of a varnish, the hydrogenated ester gum may be included in substitution, in whole or in part, for the usual ester gum or fossil resins and may be included in amounts for example, within the range of about 7%–15%. A typical varnish including for example, hydrogenated glycerol abietate may have, for example, the following formula:

|  | Range | Example |
|---|---|---|
|  | Percent | Percent |
| Hydrogenated glyceryl abietate | 7–15 | 10 |
| China wood oil | 25–40 | 30 |
| Litharge, or other drier | 0.5–2.0 | 1 |
| Naphtha | 40–70 | 59 |
| Linseed oil | 0–5 |  |

Where the hydrogenated ester gum is included in a coating composition of the character of a lacquer, such may be composed of a hydrogenated ester gum, as, for example, hydrogenated ethyl abietate, hydrogenated glyceral abietate, etc., nitrocellulose or nitrostarch and a solvent therefor. If desired, there may be added to such composition various other ingredients used in lacquers, such for example, as other nitrocellulose solvents, toluol, alcohol, etc. Where hydrogenated ester gum is used as an ingredient of lacquers, it may be used in amount within about the range 8%–18% and as in the case of varnish may be used to replace the usual ester gum or fossil gum, in whole or in part.

A typical lacquer including hydrogenated ester gum may be made, for example, according to the following formula:

|  | Range | Example |
|---|---|---|
|  | Percent | Percent |
| Nitrated carbohydrate (nitrocellulose, nitrostarch) | 10–30 | 12 |
| Hydrogenated ethyl abietate | 8–18 | 10 |
| Toluene | 5–30 | 25 |
| Ethyl acetate | 0–10 | 7 |
| Butyl acetate | 10–30 | 26 |
| Butanol and ethyl alcohol | 5–15 | 10 |
| Gum dammar solution | 5–15 | 10 |

The coating composition in accordance with my invention will contain the hydrogenated ester of a resin acid, as abietic acid, pimaric acid, and the like, such for example, as the ethyl, glyceryl, amyl, benzyl, glycol, pentaerythrite, etc., ester.

The hydrogenated ester gum for use in connection with compositions in accordance with my invention may be prepared, for example, by first esterifying a resin acid, as abietic acid, pimaric acid, etc., and then hydrogenating the ester, for example, ethyl abietate, by treating the ester with hydrogen in the presence of a suitable catalyst, as for example, finely divided palladium at room temperature, or nickel under suitable pressure and temperature conditions. For example, an abietate ester, which possesses two unsaturated double bonds, will absorb hydrogen rapidly until one double bond is saturated, after which the hydrogen will be taken up very slowly. The hydrogenation of an ester of abietic acid may be effected with a nickel catalyst under pressure within about the range 15-200 pounds at temperatures within about the range 200° C.-300° C.

Hydrogenated resin esters for use in coating compositions in accordance with my invention, may also be produced, if desired, by the esterification of a hydrogenated resin acid, as abietic acid, pimaric acid, etc., as for example, dihydro or tetrahydro-abietic acid, the ester being prepared by treating the hydrogenated abietic acid with a catalyst and an alcohol in the presence of heat, in the usual manner for esterification.

It will be understood that where in the above description of my invention reference is made to abietic acid, I intend to include rosin as well as abietic acid, as such, or in the pure state, it being understood that wood or gum rosin is essentially composed of abietic acid together with impurities. It will be understood that coating compositions in accordance with my invention may include a hydrogenated ester of abietic acid or of other resin acids, as for example, pimaric acid, or those of the fossil resins as dammar or kauri.

Having now fully described my invention, what I claim and desire to protect by Letters Patent is:—

1. A coating composition including as ingredients nitrocellulose, a hydrogenated ethyl ester of abietic acid and a solvent therefor.

2. A coating composition including as ingredients a hydrogenated ethyl ester of abietic acid, nitrated carbohydrate and a solvent therefor.

3. A coating composition including as ingredients a nitrated carbohydrate, an ester of a resin acid the unsaturation of the acyl radical of which is reduced by hydrogen and a solvent therefor.

4. A coating composition including as ingredients nitrocellulose, an alkyl ester of a resin acid the unsaturation of the acyl radical of which is reduced by hydrogen and a solvent therefor.

5. A coating composition including as ingredients a nitrated carbohydrate, an alkyl ester of abietic acid the unsaturation of the acyl radical of which is reduced by hydrogen and a solvent therefor.

6. A coating composition including as ingredients a nitrated carbohydrate, a monohydric alcohol ester of abietic acid, the unsaturation of the acyl radical of which is reduced by hydrogen and a solvent therefor.

7. A coating composition including as ingredients a nitrated carbohydrate, a glycerol ester of abietic acid the unsaturation of the acyl radical of which is reduced by hydrogen and a solvent therefor.

8. A coating composition including as ingredients nitrocellulose, a glycerol ester of abietic acid the unsaturation of the acyl radical of which is reduced by hydrogen and a solvent therefor.

9. A coating composition including as ingredients a nitrated carbohydrate, a hydrogenated glycol ester of abietic acid and a solvent therefor.

10. A coating composition including as ingredients nitrocellulose, a hydrogenated glycol ester of abietic acid and a solvent therefor.

11. A coating composition including as ingredients nitrocellulose, a monohydric alcohol ester of abietic acid, the unsaturation of the acyl radical of which is reduced by hydrogen and a solvent therefor.

IRVIN W. HUMPHREY.